June 11, 1968 L. KRDŽIĆ 3,387,444
UNIVERSAL FRUIT PICKER
Filed Feb. 10, 1965 2 Sheets-Sheet 1
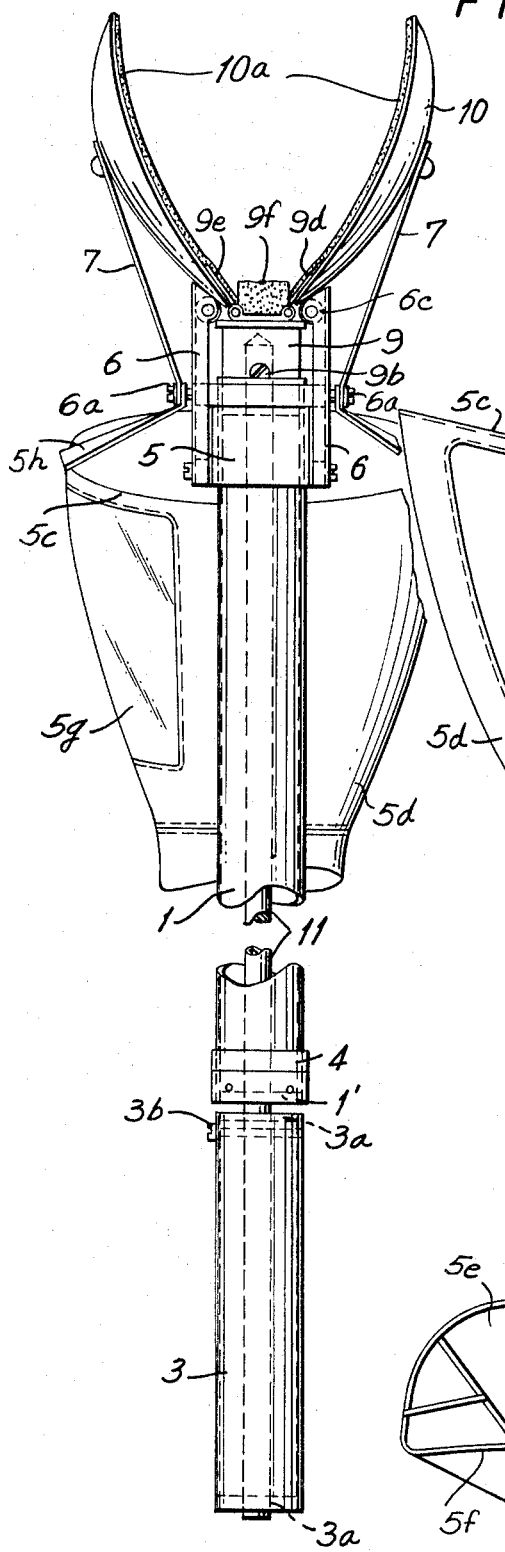
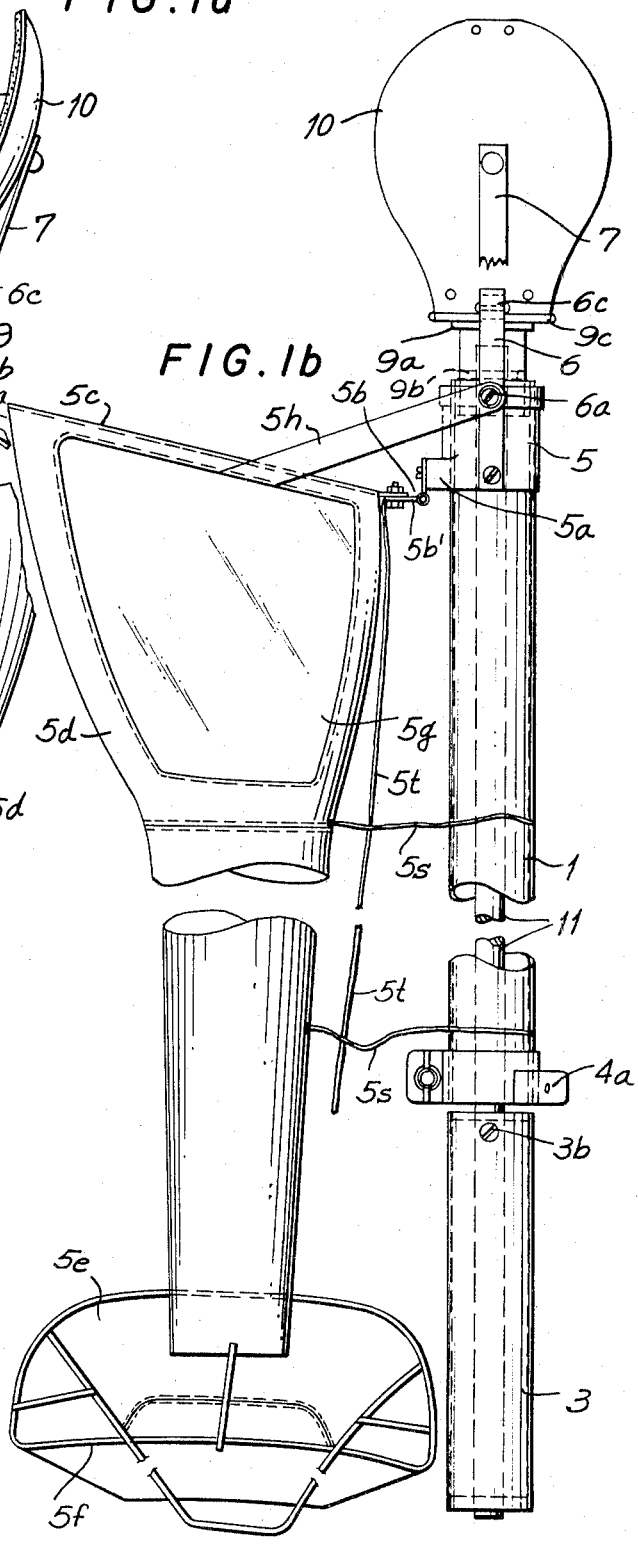
FIG. 1a
FIG. 1b

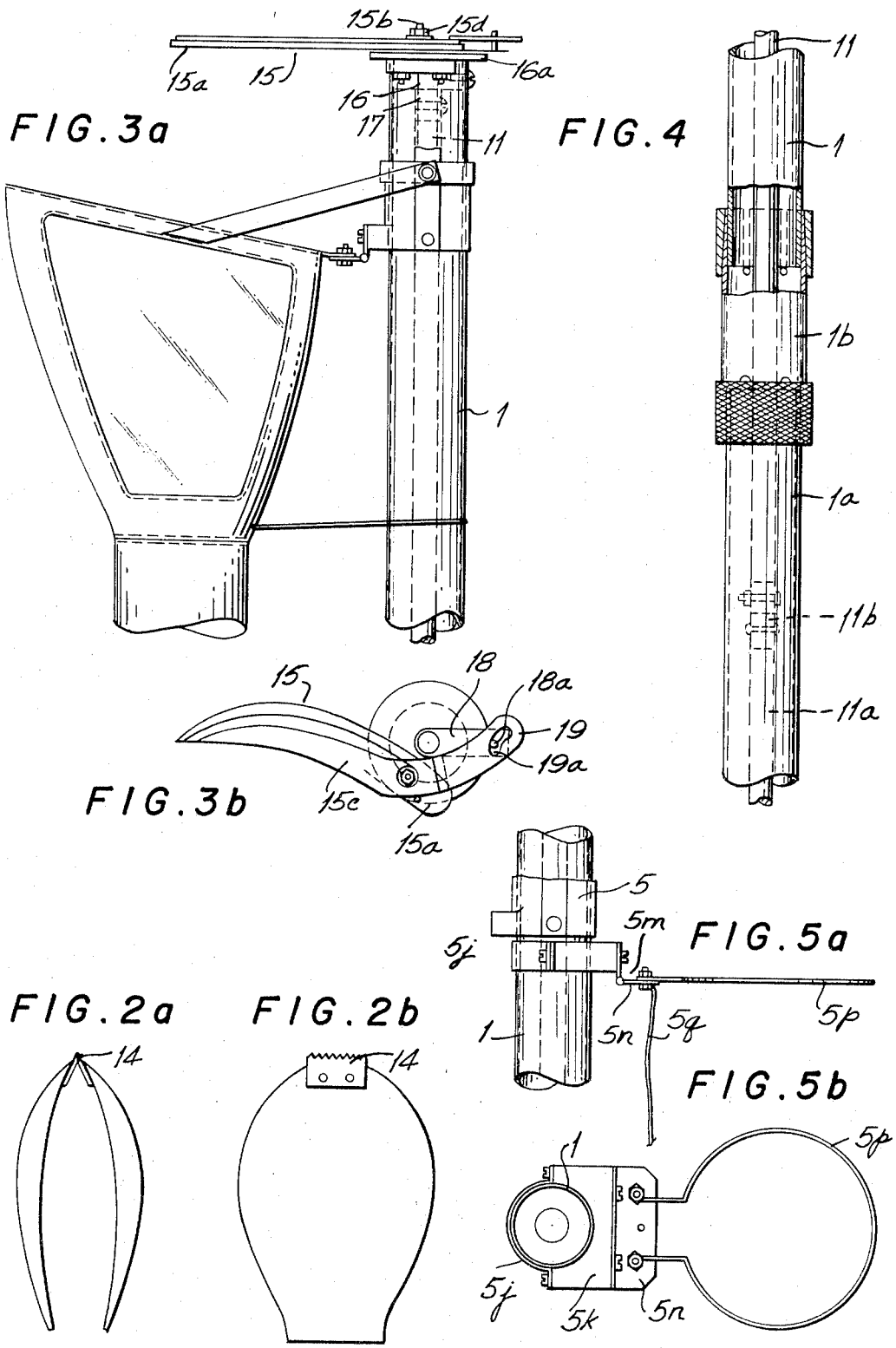

3,387,444
UNIVERSAL FRUIT PICKER
Ljubomir Krdžić, Lamartinova 20,
Belgrade, Yugoslavia
Filed Feb. 10, 1965, Ser. No. 431,673
Claims priority, application Yugoslavia, Aug. 15, 1964,
M 107/64
1 Claim. (Cl. 56—334)

ABSTRACT OF THE DISCLOSURE

A fruit picker having a control member slidably mounted in a hollow tube for operating spoon shaped cups hingedly mounted on a work head at a remote end of the tube such that the cups are opened when the control member is retracted in the tube and opened when extended whereby the picker can engage the fruit to be picked and remove the fruit by lowering the picker which fruit is then deposited into a sleeve attached to the tube and conveyed thereby to a container carried by the operator.

---

The present invention relates to a universal fruit picker for picking fruit. The conventional pickers are limited in use and can pick, for instance, only apples or only pears, and they cannot be used for picking other kinds of fruit without damaging them. Such devices mainly consist of a bag, made of light cloth, fixed to the lower edge of a toothed sheet frame, which is, in turn, fixed to the end of a wooden pole up to four meters long. A different type of picker consists of a bag the opening of which is held by a frame, which is fixed to the pole, with a pair of vertically operating scissors, positioned above the bag opening. The picker operator brings his pole, with the scissors on its upper end, to the selected fruit and aims the picker in such a direction as to position the bag opening below the fruit, and the tooth blades or scissors against the stalk. By jerking and turning the pole, the operator cuts the stalk with the toothed frame, enabling the fruit to fall into the bag in which only four or five fruits can be placed. In the case of other scissors-equipped pickers, the operator pulls the rope tied to the free end of the scissors-moving arm, after having positioned the fruit, by means of the scissors, in such a way that the fruit stalk is in a horizontal position at least as much as is necessary for the stalk to be cut by vertically operating scissors. A disadvantage of this type of picker is that the operator, while advancing towards the selected fruit with the picker, may cut other ripe fruits which may fall on the ground and be damaged. A further disadvantage of these pickers is that the fruits which fall into the bag strike one another, and although the height of their fall is relatively very small, they may still be damaged. Another disadvantage is also that it is rather tedious for the operator to lower the pole with the picking device on top of it in order to take out of the bag each particular fruit as soon as it has fallen into the bag, thus preventing the fruits from being damaged in the bag itself. The fruit picking operation by means of these pickers is unreliable and uneconomical because other fruit may easily become detached as well so that the orchard proprietor may sustain great losses. The length of the pole is limited, and this limits the height from which the fruit can be collected, this being a further disadvantage of the above described fruit pickers.

According to the present invention there is provided a universal fruit picker which is characterized by low weight, simple design, simple and easy handling, high efficiency and very high reliability. The picker according to present invention can be used in all orchards irrespective of their location, either in plains or on low or high slopes. Moreover, the low initial price and maintenance cost of present universal fruit picker make it available even to orchard owners of lower financial means.

The universal fruit picker according to present invention in a preferred embodiment consists mainly of an elongated aluminum tube, or one end of which a head is fixed with holding cups or a pair of scissors, both these devices being controlled by a control handle located at the far end of the aluminum tube, through which a central rod passes operating the holding cups or the scissors which pick the fruit and let it fall, after passing through a special sleeve, into a bag which the operator carries in front of him.

Further features and other objects and advantages of present invention will become obvious to those skilled in the art from the following detailed description of a fruit picker taken with reference the appended drawings. In these drawings:

FIGS. 1a and 1b are front and side elevations illustrating general views of the universal fruit picker according to the concepts of the invention;

FIGS. 2a and 2b are front and side elevations of the fruit holding spoon-like cups from FIG. 1, on top of which toothed jaws are added for picking clustered fruits;

FIGS. 3a and 3b are a side elevation and top plan of the universal fruit picker in which the spoon-like cups have been replaced by horizontally operating scissors;

FIG. 4 is a view of the means for lengthening the picker tube and control rod; and FIGS. 5a and 5b are a side elevation and a top plan view of the fruit classification ring.

Hereinafter FIGS. 1a and 1b will be referred to as FIG. 1, FIGS. 2a and 2b as FIG. 2, FIGS. 3a and 3b as FIG. 3 and FIGS. 5a and 5b as FIG. 5.

Referring now to the drawings: in the interior of a long aluminum tube 1, a control rod 11 is inserted. One of its ends is secured to a control handle 3, while the other operates a head 9, on which a pair of spoon-like, holding cups 10 are secured. The head 9 is cylindrical in shape, and is located at the end of the tube 1 opposite the end at which the handle 3 is located. At the end of tube 1 where the head 9 is inserted, there is secured a main ring 5 with two shoulders 6, extending parallel to the longitudinal axis of tube 1. Screws 6a are used to secure shoulders 6 against the ring 5, and they also serve to fix the ring 5 to the tube 1. In the free ends of shoulders 6 there are small rollers 6c, the axes of which are at right angles with the long axis of tube 1. These rollers 6c act as supports for the spoon-like cups 10 when the convex areas of the latter touch the rollers at the moment when the cups open. One end of the head 9 is machined in the form of a flange 9a which prevents the head 9 from slipping entirely into the tube 1. Near the end of the tube 1 there is a longitudinal slot (not illustrated) serving to guide head 9. A machine screw is inserted through this slot into the head 9 enabling it to move only as far as the said slot permits. A machine screw 9b is used to fix the head 9 to the upper end of the control rod 11. A member 9c constituting two hinges is secured to the flanged end of the head 9 in such a way that the free wings 9d and 9e of the member 9c carry a pair of the spoon-like holding cups 10, the concave surfaces of which are covered with a thin layer of foam rubber 10a. Short, light, preferably rubber springs 7 are fixed to the outer, convex sides of the cups 10, the other end of these springs being fixed to upper screws 6a of shoulders 6. The springs 7 help cups 10 to open when the control handle 3 pushes up the control rod 11 which operates the cups 10 to grip the fruit. The upper free side of the member 9c is also covered with a piece of foam rubber 9f in order to protect the fruit from any possible damage.

The lower end of the control rod 11 is axially inserted into the control handle 3, passing first through a disc 1' at the lower end of the tube 1, and then through two discs 3a located at both ends of the control handle 3. The rod 11 is secured to the handle 3 by means of a screw 3b inserted across the handle 3 and rod 11. A ring 4 with a rest 4a is fixed to the lower end of the tube 1, the rest 4a acting as a support for the thumb of the operator's hand with which he holds the control handle 3 during operation.

At the lower edge of the main ring 5, between the shoulders 6, there is a rectangular extension 5a with a hinge 5b. A circular frame or loop 5c, made of steel wire, is fixed to the free wing 5b' of the hinge 5b. The wire loop passes through the upper border of a sleeve 5d, made of fabric or silk, and preferably of parachute silk. This sleeve is longer by approximately one third than the tube 1. The fruit picked falls through this sleeve into a fabric bag 5e, which is held in open position by an aluminum frame 5f. One side, preferably the left hand side, of the sleeve 5d, is made of transparent plastic sheet which serves as a window 5g through which the operator can see the fruit while it is being picked. The sleeve 5d is permitted to fall freely along the tube 1 so that its lower end reaches into the bag 5e which is carried by the picker operator and is held by a strap in front of him. But the sleeve is fixed by means of short lengths of manila line 5s tied in loose loops to the tube 1, these loops permitting the sleeve to move freely about and along the tube 1, but preventing the sleeve from flying round the operator. The sleeve's lower end is fixed by means of straps and safety pins to the bag 5e in such a manner as to enable the picked fruit to fall always directly into the middle of the bag 5e from where the fruit is collected by the operator's assistant and packed in boxes, crates, baskets, etc.

The wire loop 5c is held by means of short and light, preferably rubber, strap springs 5h to upper screws 6a used to secure the shoulders 6 to the main ring 5. These springs 5h holds the loop 5c in such a position that the plane of the loop 5c is always at an angle of less than 90 degrees in relation to the tube 1. Such a position is required in order to ensure that the fruit, when released by the cups 10, always falls directly into the sleeve 5d and not outside of it.

Around the tube 1, either directly above or directly below the ring 5, a block 5k can be secured by means of a light metal strap 5j, the block 5k being arranged diametrically in relation to the sleeve 5d on the other side of the tube 1. A spring loaded hinge 5m is fixed to the block 5k in such a way that the free wing 5n of the hinge 5m is always at right angles in relation to the tube 1. A circular classification loop 5p, made of thin steel wire, is fixed by any known manner to the free wing 5n of the hinge 5m, the diameter of this loop being determined by the size of the fruit which is to be picked.

In addition, a light manila line 5q is tied to the free wing 5n which carries the wire loop 5p, and is used to bring the wing 5n, together with the loop 5p, down against the tube 1 and hold it there when it is not necessary to use the classification loop 5p during a fruit picking operation. The diameter of the loops 5p is determined by the operator himself.

Small toothed jaws 14 can be fixed to the upper, approximately circular edges of the spoon-like holding cups 10 in such a manner that the teeth of these jaws protrude a short distance above the upper edges of the cups 10, as shown in FIG. 2. These jaws are used for picking clustered fruit such as cherries, plums, etc. When used, the jaws grip and cut the stalks while the clustered fruits are held securely by the cups 10 lined with foam rubber 10a.

When picking fruits or flowers with strong stalks, such as pears, roses, etc., instead of head 9 with cups 10, a pair of scissors 15 is mounted on top of the tube 1. Upon removal of head 9 from the upper end of the control rod 11, a flanged head 16 with scissors 15 is mounted thereupon. The fixed arm 15a of scissors is permanently secured to the flange 16a of the head 16. The same scissors arm has on its upper side an axle 15b around which the rotating arm 15c of scissors is secured by means of a nut 15d acting through two washers, one of which is a plain washer while the other is a spring washer. The control rod 11 is secured directly to the shaft 17 of the head 16. On the upper end of the shaft 17 protruding above the upper surface of the flange 16a a short rod 18 is attached with a post 18a on its free end. The rotating arm 15c of the scissors 15 has, at its free end 19, a short, arched slot 19a, which encompasses the post 18a. The scissors are operated by turning the control handle 3 (FIG. 1) in clockwise direction when cutting the fruit or flower stalks and in counter-clockwise direction when opening the scissors, the turning motion of the rod 11 being transmitted through the shaft 17 to the rod 18, the post 18a of which sets the rotating end 15c of the scissors 15 in motion.

The length of the universal fruit picker according to the present invention can be readily increased from the length set by the basic tube 1 in sch a manner that the tube 1 is lengthened by an extension tube 1a using a connector 1b. The control rod 11 is lengthened by means of rod 11a, at the end of which there is a coupling 11b. When tube 1 and the control rod 11 are to be lengthened, it is necessary to remove first the control handle 3. In the preferable form of embodiment of this invention, the basic tube 1 and the basic control rod 11 are lengthened by two additional tubes 1a and two additional control rods 11a at most. Thus, with the fruit picker fully lengthened, an operator can work at an operating height of 7 to 8 meters (23 to 27 feet).

When fruit picking is in progress, the universal picker is held by the operator in one hand, for instance, the left hand, while the control handle 3 is held in the other hand.

Fruits such as apples, peaches, apricots, oranges, grapefruits, figs, etc., are picked by using the spoon-like holding cups 10. The control handle 3 is pushed up by means of the thumb of the hand in which the operator holds the handle. The cups 10 are then opened and brought near the fruit to be picked. By first turning the picker 180 degrees about its longitudinal axis, the operator first checks the size of the selected fruit by attempting to pass it through the classification loop 5p. If the fruit is of the selected size, the operator brings the open cups again near the fruit so that the cups close around the fruit and when the operator pulls down the control handle 3, gripping firmly, but without undue pressure, the fruit will be enclosed in the spoon-like holding cups 10 lined with soft foam rubber 10a. By bringing the entire picker downwards, the stalk of the fruit is broken and the fruit itself held in the cups. After adjusting the position of the picker in such a way that its longitudinal axis is at an angle of not more than 15 or 20 degrees in relation to the vertical axis, and ensuring that the fruit, when released by the cups, will not fail to fall into the opening of the sleeve 5d, the handle 3 is pushed up, the cups 10 are opened and the fruit falls undamaged through the sleeve 5d into the bag 5e, from which the fruit is collected by the operator's assistant who packs them in boxes, crates, baskets, or the like. If the fruits are inside dense branches, the loop 5c is pulled down by means of a manila line secured to the free wing 5b' of the hinge 5b. The fruit is picked in the above described manner, the picker with cups 10 in closed position holding the picked fruit is brought out of the fruit tree crown, the loop 5c is released to return into its normal position, the handle 3 is pushed up to release the fruit which travels to the bag 5e.

Fruit such as plums, cherries, etc., which come in clusters, are picked by the universal picker according to this invention with the toothed jaws 14 mounted on the upper edges of cups 10. Here, again, the operator brings the cups 10 with jaws 14 mounted thereon in open position to the selected cluster of fruit, aiming in such a direction as to position the toothed jaws against the stalks of the cluster. The cups 10 are then closed so as to grip firmly the fruit. The picker is then lowered while the cups in closed position hold the selected fruit, so that the stalks are cut, and after adjusting the position of the tube 1 so as to make an angle of 15 to 20 degrees in relation to the vertical, the cups 10 are opened by the operator in the manner described above, thereby allowing the fruit to fall into the bag 5e through the silk sleeve 5d.

Fruit with a strong stalk, such as pears, quinces, lemons, etc., are picked by using the scissors 15 which replace the head 9 with cups 10. The scissors 15 in their open position are brought towards the stalk, the operator's ensuring, by watching through the window 5g, that the fruit hangs directly over the sleeve 5d. Instead of operating the handle 3 up and down, in this case the operator turns the handle in clockwise direction cutting the stalk, whereupon the fruit falls into the bag 5e in the above described manner.

Although the preferred embodiment of the invention has been shown in the drawings and described in detail above, it will be noted that various modifications may be provided which are within the spirit and scope of this invention, as defined in the hereafter set forth claim.

What I claim is:

1. A fruit picker comprising an elongated hollow member having a work end and a control end, a control member slidable in the hollow member and having ends extending therefrom, a control handle on the control member at the control end thereof, a work head on the control member at the work end thereof, a pair of hinges secured to the head, a pair of spoon-shaped fruit holding cups hingedly secured to the hinges on the head, frictionless members mounted on the hollow member to engage the outside of the cups and urge them toward each other with the work head retracted toward the work end of the hollow member, resilient means connected to the cups and to the hollow member urging them apart in opposition to retraction of the workhead, a wire loop hingedly connected to the work end of the hollow member, a sleeve of flexible material depending from the loop, and means resiliently supporting the loop in operative position for the sleeve to receive fruit picked from a tree by the cups upon actuation by the control handle.

References Cited

UNITED STATES PATENTS

| | | | |
|---|---|---|---|
| 620,195 | 2/1899 | Stewart | 56—335 |
| 888,459 | 5/1908 | Bolinski | 56—334 |
| 925,212 | 6/1909 | McConville | 56—333 |
| 1,743,580 | 1/1930 | Tantlinger | 56—336 |
| 3,199,280 | 8/1965 | Wilczek | 56—334 |

ANTONIO F. GUIDA, *Primary Examiner.*

ABRAHAM G. STONE, *Examiner.*

P. A. RAZZANO, *Assistant Examiner.*